(12) United States Patent
Miyaoku et al.

(10) Patent No.: US 8,100,028 B2
(45) Date of Patent: Jan. 24, 2012

(54) CORNU'S SPIRAL TOOTH GEAR

(76) Inventors: Tsutomu Miyaoku, Hiroshima (JP);
Jiro Kanehiro, Hiroshima (JP);
Hidekazu Sasaki, Hiroshima (JP)

( * ) Notice: Subject to any disclaimer, the term of this patent is extended or adjusted under 35 U.S.C. 154(b) by 537 days.

(21) Appl. No.: 11/887,993

(22) PCT Filed: Apr. 6, 2006

(86) PCT No.: PCT/JP2006/307786
§ 371 (c)(1),
(2), (4) Date: Oct. 5, 2007

(87) PCT Pub. No.: WO2006/109838
PCT Pub. Date: Oct. 19, 2006

(65) Prior Publication Data
US 2009/0049942 A1    Feb. 26, 2009

(30) Foreign Application Priority Data
Apr. 8, 2005  (JP) ................................ 2005-139033

(51) Int. Cl.
*F16H 55/00*    (2006.01)
(52) U.S. Cl. ........................................ 74/462
(58) Field of Classification Search .............. 74/640, 74/457, 462
See application file for complete search history.

(56) References Cited

U.S. PATENT DOCUMENTS

| | | | | |
|---|---|---|---|---|
| 1,525,642 A * | 2/1925 | Cox | ............................... | 74/462 |
| 2,128,815 A * | 8/1938 | Guest | ............................... | 74/462 |
| 4,121,482 A | 10/1978 | Ishikawa et al. | | |
| 5,315,790 A * | 5/1994 | Kish et al. | ......................... | 451/5 |
| 6,080,199 A * | 6/2000 | Umeyama et al. | ................ | 703/1 |
| 6,178,840 B1 * | 1/2001 | Colbourne et al. | ............. | 74/462 |
| 2008/0005212 A1 * | 1/2008 | Levien | ........................... | 708/275 |

FOREIGN PATENT DOCUMENTS

| | | |
|---|---|---|
| JP | 53-52852 A | 5/1978 |
| JP | 55-14934 B2 | 4/1980 |
| JP | 55-38541 B2 | 10/1980 |

(Continued)

OTHER PUBLICATIONS

Japanese Office Action issued on Apr. 28, 2009, in Japanese Patent Application No. 2007-513030, and English Translation thereof.

(Continued)

*Primary Examiner* — Vicky Johnson
(74) *Attorney, Agent, or Firm* — Holtz, Holtz, Goodman & Chick, PC (57) ABSTRACT

A Cornu's spiral is applied to a tooth profile of a gear. In accordance with the application of the gear, the Cornu's spiral may be modified two-dimensionally by some constant proportion. Since Cornu's spirals have similarity are similar, when a pressure angle is determined, the tooth profile can be standardized by a module, so that it is highly versatile.

By replacing the tip of a tooth and the bottom of a tooth by another curve, such as an arc, the range of application can be increased. Since working is always by flank contact between a protrusion and a recess, contact surface stress is low. In addition, the radius of curvature of a dedendum is large. Therefore, tooth bending stress is low, and fatigue strength is high. Even if the number of teeth is small, an undercut is not produced. Even if there is no backlash, a smooth working is achieved, so that the tooth profile is suitable for devices requiring precise alignment.

3 Claims, 6 Drawing Sheets

FOREIGN PATENT DOCUMENTS

| | | |
|---|---|---|
| JP | 2-15743 B2 | 4/1990 |
| JP | 07208578 A * | 8/1995 |
| JP | 11-094052 A | 4/1999 |
| JP | 2000-170882 A | 6/2000 |
| JP | 2001-248710 A | 9/2001 |
| JP | 2004-013797 A | 1/2004 |

OTHER PUBLICATIONS

Yatarou Kanai, "Design and Setting of Clothoid Curve Using Personal Computer and Programmable Electronic Calculator," published by Sankaido Publishing Co., Ltd., Jan. 20, 1984.

* cited by examiner

$$E = \sqrt{(X_c)^2 + (Y_c)^2 - \left(\frac{\pi m}{4}\right)^2} \cdots (3)$$

MODULE m = 3
PRESSURE ANGLE α = 20°
NUMBER OF TEETH Z = 18

FIG. 8

MODULE m = 3
PRESSURE ANGLE α = 20°
NUMBER OF TEETH Z = 18

FIG. 9

MODULE m = 3
PRESSURE ANGLE α = 20°
NUMBER OF TEETH Z = 18

MODULE m = 3, DISTANCE BETWEEN CORES = 54 mm

4° ROTATION STATE

CORNU'S SPIRAL TOOTH GEAR

This application is a U.S. National Phase Application under 35 USC 371 of International Application PCT/JP2006/307786 filed Apr. 6, 2006.

TECHNICAL FIELD

The present invention relates to a basic tooth profile of a gear including a rack and a pinion (hereunder referred to generically as "gear"). The present invention provides a novel tooth profile curve that can reduce vibration and noise of the gear, reduce wear of a tooth flank, and increase bending strength and contact surface strength of a tooth.

BACKGROUND ART

At present, the most generally used basic tooth profile for a gear is an involute tooth profile, and is used in various mechanical devices of the industrial society. The main advantages include the following four points. They are (a) transmission rotation is performed at a constant velocity ratio, (b) generative processing with a hob cutter is easily carried out, (c) even if a slight error occurs in the precision with which a tooth profile is processed or the precision with which a gear system is assembled, this error does not, practically speaking, adversely affect the transmission of rotation, and (d) the basic tooth profile is controlled by a module. In contrast, unsolved problems include the following six points. They are (1) during use, the slippage ratio at a tooth flank is large, thereby causing the tooth flank to wear often, (2) since protrusion flanks engage each other, contact surface pressure of the flanks of teeth is large, thereby causing wearing and pitting to occur often, (3) since stress at a dedendum based on the dedendum profile is large, the dedendum tends to break due to a high load and shock, (4) undercutting occurs in the dedendum when the number of teeth is less than or equal to a certain number of teeth during hob cutting process, (5) actually, unless there is proper backlash, it is difficult to perform smooth working rotation, and (6) a noise level that is generated during operation by, for example, vibration of a tooth or backlash is high.

To overcome these problems, many proposals have been made up until now. The historical trend of these proposals is as follows. On the one hand, involute tooth profiles are modified. On the other hand, research in new tooth profiles, typically a cycloidal tooth profile or an arcuate tooth profile, is conducted. Accordingly, further improvements are being made in various aspects.

A method of modifying a symmetrically arcuate tooth profile gear is proposed as one investigation of a new tooth profile in Japanese Examined Patent Application Publication No. 55-38541. This method is designed to prevent working of involute curves near a connection point (existing on a pitch line) of arcs. However, generative processing for purposely modifying the gear needs to be performed generation cutting again. In addition, the range and amount to be eliminated by the modification processing are not clear. Moreover, since an error in the distance between centers of a pair of gears caused by an assembly error cannot be prevented from occurring, this modification processing has almost no effect.

In addition, Japanese Examined Patent Application Publication No. 55-14934 proposes an improvement in a WN gear (Wildhaver-Novikov gear). According to the proposal of the improvement, only one point contact working, which is the greatest disadvantage of the WN gear, is modified to a two-line working. An average radius of radii of two protruding and recessed arcuate teeth profiles, at which the strengths of flanks of the teeth become greatest in the WN gear, is determined from a relational expression of an addendum length and a minimum pressure angle. In addition, a relational expression between a pressure angle and a helix angle, at which the working becomes two-lines working, is proposed. However, the WN gear cannot transmit rotation unless it is a helical gear. Necessarily, there is a limit to a tooth face, and, at the same time, a high gear cutting precision and assembly precision are required. In addition, vibration and noise are high, as a result of which the WN gear is rarely put into practical use at intermediate and high-speed regions.

In recent years, Japanese Patent No. 1606158, Japanese Examined Patent Application Publication No. 2-15743, and Japanese Unexamined Patent Application Publication No. 11-94052 have proposed a curvature wave variable gear, called a Logix gear (trade name), and improvements thereof. The main points of these proposals are that arcuate teeth profiles are provided near an working start portion of teeth flanks and an working end portion of the teeth flanks, and that a portion therebetween is connected by a continuous curve which can be differentiated and whose curvature increases and decreases periodically in a tooth depth direction. However, they do not disclose a specific differential formula and a periodical increase/decrease rate of curvature change, which are required for forming a realistic basic tooth profile curve. In particular, a method of connecting the arcs and the curve, which is most important in a tooth profile, is not made clear.

An object of the present invention is to basically overcome the aforementioned problems (1) to (4), which are not yet practically overcome by the various attempts made, by improving a tooth profile. Another object of the present invention is to provide a novel tooth profile that provides characteristics that are equivalent to those of the aforementioned (a) to (d), which are advantages of the involute tooth profile.

DISCLOSURE OF INVENTION

Figure 1:
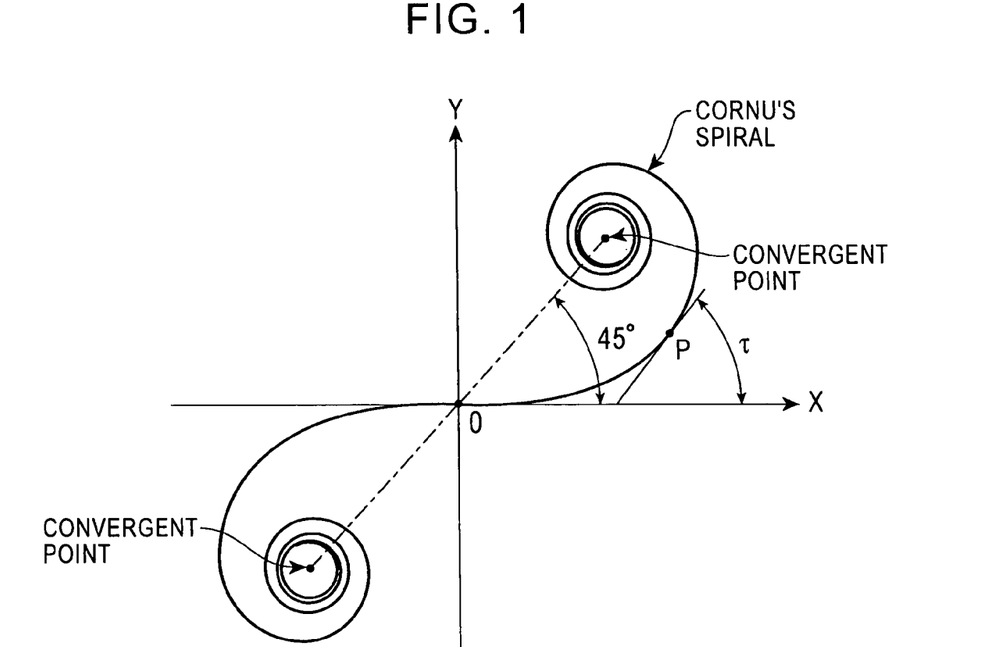
FIG. 1 illustrates a Cornu's spiral used in the present invention.

Until now, the present inventor et al. investigated various curves that are not used as tooth profiles and have tried to apply them as tooth profiles. The investigation results show that a gear having a Cornu's spiral as a tooth profile has excellent characteristics that are not provided by related tooth profiles, as a result of which this invention is achieved. As shown in FIG. 1, a Cornu's spiral is known as a curve whose curvature constantly increases and decreases at a constant rate in proportion to a length measured along the curve, and which converges at certain points. An industrial application of the Cornu's spiral is a clothoid curve in a civil engineering structure. The clothoid curve is also called a transition curve, and allows a smooth, safe steering operation when switching from a high-speed travel path having a small curvature to a low-speed guide path having a large curvature. The mathematics of the clothoid curve is discussed in detail in, for example, "Design and Setting of a Clothoid Curve" by Yataro Kanai. The present inventor et al. have manufactured a gear by way of trial using the basic-figure solving method disclosed in this document.

When a tooth profile is formed using the Cornu's spiral, (1) to (3) hold. That is, (1) a tooth profile in which the entire locus of a tooth profile curve from the bottom of a tooth to the tip of a tooth is only formed on the basis of the Cornu's spiral is particularly called a basic Cornu's spiral tooth profile. (2) Of the entire tooth profile curve, the Cornu's spiral may be used in a range in which a contact surface pressure is high, and a straight line or a curve other than the Cornu's spiral may be used in other ranges and connected to the Cornu's spiral. (3) A transformation Cornu's spiral, which is obtained by expanding or contracting the Cornu's spiral at a predetermined aspect ratio, may be used to form the tooth profiles that are similar to those of the aforementioned (1) and (2). The tooth profiles that are formed in accordance with the aforementioned (1) to (3) are hereunder generically called "Cornu's spiral tooth profiles."

BEST MODE FOR CARRYING OUT THE INVENTION

A method of forming a tooth profile curve using a drawn Cornu's spiral will be described using FIGS. 1 to 4. First, Kanai's formulas that are disclosed in the aforementioned document concerning a clothoid curve will be used for the Cornu's spiral. An X coordinate and a Y coordinate of a point P on the Cornu's spiral in FIG. 1 are determined by the following Formulas (1) and (2):

$$X = A\sqrt{2\tau} \sum_{i=1}^{n} \left\{ \frac{1}{(4i-3)\{(2i-2)!\}} (-1)^{i+1} \tau^{2i-2} \right\} \quad (1)$$

$$= A\sqrt{2\tau} \left\{ 1 - \frac{1}{10}\tau^2 + \frac{1}{216}\tau^4 - \frac{1}{9360}\tau^6 + \frac{1}{685440}\tau^8 - \dots \right\}$$

$$Y = A\sqrt{2\tau} \sum_{i=1}^{n} \left\{ \frac{1}{(4i-1)\{(2i-1)!\}} (-1)^{i+1} \tau^{2i-1} \right\} \quad (2)$$

$$= A\sqrt{2\tau} \left\{ \begin{array}{l} \frac{1}{3}\tau - \frac{1}{42}\tau^3 + \frac{1}{1320}\tau^5 - \\ \frac{1}{75600}\tau^7 + \frac{1}{6894720}\tau^9 - \dots \end{array} \right\}$$

where A is a Cornu's spiral parameter (has a length dimension) defined by $LR=A^2$ and in mm, L is the length in mm of an arc of a curve from an origin O to the point P, R is a curvature radius in mm at the point P, and $\tau$ is an angle in radians between a tangent line at the point P and an X axis.

By calculating the X and Y coordinate values from Formulas (1) and (2) for the Cornu's spiral, it is possible to perform machining on the basis of numerical control. That is, it is possible to manufacture a gear for a general purpose at a low cost without any problems by a gear processing facility that is currently in practical use, such as a machining center or a wire cut electric spark machine. It goes without saying that it may be manufactured using a hob cutter for gear generative processing.

Figure 2:
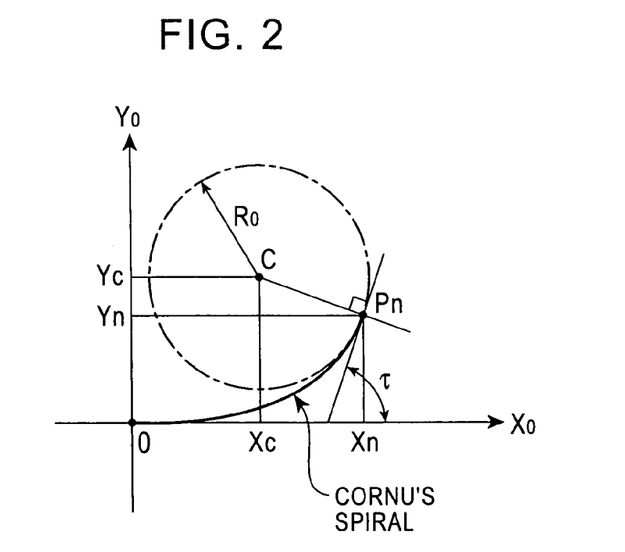
FIGS. 2 and 3 illustrate the process of forming a tooth profile curve by the Cornu's spiral.
Figure 3:
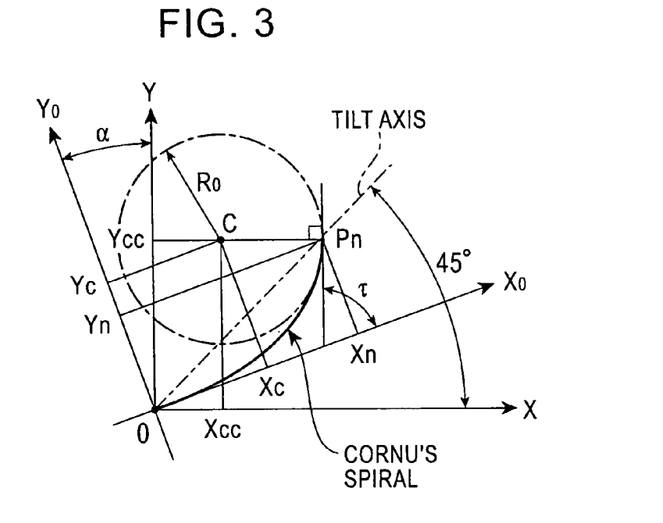

Next, using FIGS. 2, 3, and 4, the procedure used in obtaining a tooth profile curve from the Cornu's spiral will be described in detail. All lengths, including coordinate values, are hereunder all in mm. In addition, angles in formulas are all in radians.

Step 1: Coordinates of a point Pn on a Cornu's spiral shown in FIG. 2 are expressed as Xn and Yn, a radius of a circle inscribed in a curve at the point Pn is expressed as $R_0$, and a center point is expressed as C. Here, coordinate axes $X_0$ and $Y_0$ are called Cornu's spiral base axes.

Step 2: If coordinates of the center point C of the circle inscribed in the Cornu's spiral at the point Pn are expressed as Xc and Yc, the Xc value and the Yc value are determined by the following Formulas (3) and (4):

$$Xc = Xn - R_0 \times \sin \tau \quad (3)$$

$$Yc = Yn + R_0 \times \cos \tau \quad (4)$$

Step 3: A module of a basic tooth profile to be obtained is determined, and a length of a dedendum of the tooth profile to be completed is predicted to provide temporary values of $R_0$ and Yc. Here, to determine the temporary values, FIG. 5 (described below) is used.

Step 4: The aforementioned Formulas (1) and (2) are used to determine the $\tau$ value and A of the Cornu's spiral in FIG. 2.

Step 5: If a length of an arc of a curve from the origin O to the point Pn is Ln, and a unit length of N divided segments (N is an integer) of Ln is s, Ln and s are determined by the following Formulas (5) and (6), respectively:

$$Ln = 2\tau \times R_0 \quad (5)$$

$$s = Ln/N \quad (6)$$

Step 6: $\tau_j$ of N points on the Cornu's spiral from the origin O to the point Pn is determined by the following Formula (7):

$$\tau_j = \frac{1}{2}\left(\frac{s \times j}{A}\right)^2 \quad (7)$$

where j=1, 2, 3, ..., N

Step 7: The values A and $\tau_j$ determined in this way are substituted into Formulas (1) and (2) to determine the $X_0$ coordinate value and the $Y_0$ coordinate value at each point on the Cornu's spiral. Each point is connected to each other by a smooth curve to complete the Cornu's spiral.

Step 8: Then, $\tau_n$ and the $X_0$ coordinate value Xn when J=N is used to determine the value Xc by the following Formula (8):

$$Xc = Xn - R_0 \times \sin \tau_n \quad (8)$$

Step 9: The entire Cornu's spiral base axes and figures obtained in this way are rotated counterclockwise by a degrees around the origin O serving as center of rotation. Then, the horizontal coordinate axis X and the vertical coordinate axis Y passing through the origin O are provided again to obtain FIG. 3. Here, the angle α between the axes $Y_0$ and Y becomes a pressure angle at the tooth profile. New coordinate values Xcc and Ycc of the point C are determined by the following coordinate transformation Formulas (9) and (10):

$$Xcc = Xc \times \cos \alpha - Yc \times \sin \alpha \quad (9)$$

$$Ycc = Xc \times \sin \alpha + Yc \times \cos \alpha \quad (10)$$

Step 10: Next, until the Y coordinate value Ycc that is set when the X coordinate value of the Cornu's spiral is a maximum in FIG. 3 becomes a value that is very close to πm/4, the calculations from Steps 3 to 10 are repeated. Here, it is desirable that $R_0$ is a fixed value, and Ycc is a variable so that the following Formula (11) is satisfied:

$$\left|Ycc - \frac{\pi m}{4}\right| < 0.00005 \quad (11)$$

Step 11: The Cornu's spiral, obtained by the above-described steps, is reversed with respect to a tilt axis that is tilted from the X axis by 45 degrees, that passes through the origin O, and that serves as a rotational axis. The Cornu's spiral obtained in this way corresponds to a basic Cornu's spiral tooth profile curve shown in FIG. 4. The interval from the origin O to a tooth tip portion is ¼ pitch of the basic Cornu's spiral tooth profile.

Figure 4:
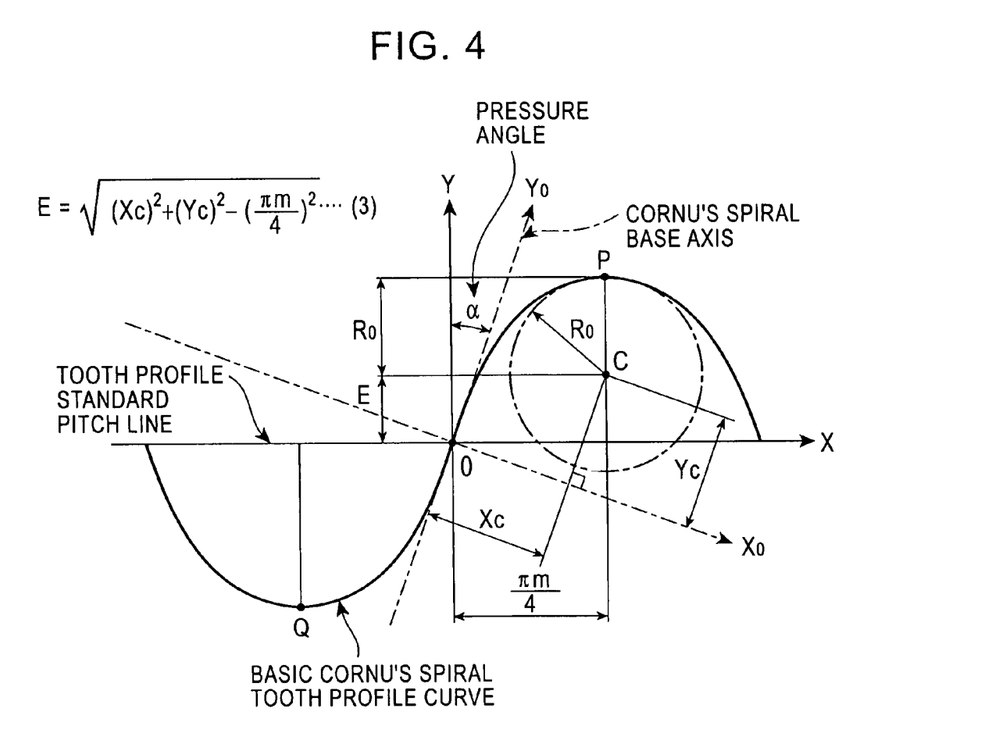
FIG. 4 shows a basic Cornu's spiral tooth profile according to an embodiment of the present invention, the entire locus of a tooth profile curve being only formed on the basis of the Cornu's spiral.

For the curve obtained in FIG. 4 to be used as a tooth profile curve, a geometrical condition that satisfies the two following relations at the same time is required. The conditions are that (A) a Y coordinate value of the center C of the circle having the radius $R_0$ and inscribed at a tooth tip portion P is E, and (B) an X coordinate value of C is πm/4. Here, m is the module of the tooth profile, and can be arbitrarily selected. If the distances of the center point C of the inscribed circle from the Cornu's spiral base axes are Xc and Yc, respectively, E is determined by the following Formula (12) from the aforementioned geometrical conditions:

$$E = \sqrt{(Xc)^2 + (Yc)^2 - \left(\frac{\pi m}{4}\right)^2} \quad (12)$$

The inventor et al. determined a ¼ pitch of the tooth profile curve by the above-described steps, and replaced the parameter A of the Cornu's spiral by the module m of the tooth profile. In addition, by providing the pressure angle α, a basic tooth figure, formed by the basic Cornu's spiral having the point P as the tip of a tooth and a point Q as the bottom of a tooth (that is, formed by the curve that is shown in FIG. 4 and that is only formed by the Cornu's spiral), was obtained. Further, the inventor et al. found out that the tooth profile defined by the basic Cornu's spiral and formed by providing the module m and the pressure angle α was identified by only one curve. That is, the basic Cornu's spiral tooth profile having the pressure angle α is only provided one at a time with respect to each module m. Accordingly, identically to the case of a related involute tooth gear, the module m allows a tooth profile to be standardized and controlled.

As mentioned above, since the Cornu's spiral is a transition curve connecting a straight line and an arc, even if the straight line has a certain angle, it can be smoothly connected to the arc at a certain position. Therefore, the pressure angle allows an optimum angle to be arbitrarily selected in accordance with the purpose of use of a gear. This suggests a very high possibility of application development in the future. The inventor et al. varied the pressure angle over a wide range and evaluated the obtained tooth profile figures. The results show that, as the pressure angle decreases, the tip of a tooth and the bottom of the tooth become sharp, thereby making the tooth profile difficult to use if the pressure angle is less than 10 degrees. In contrast, if the pressure angle is increased, the tip of the tooth and the bottom of the tooth become too smooth, thereby impairing the function of the tooth profile. If the pressure angle exceeds 25 degrees, the tooth profile loses practicality when only a Cornu's spiral is used.

Figure 5:
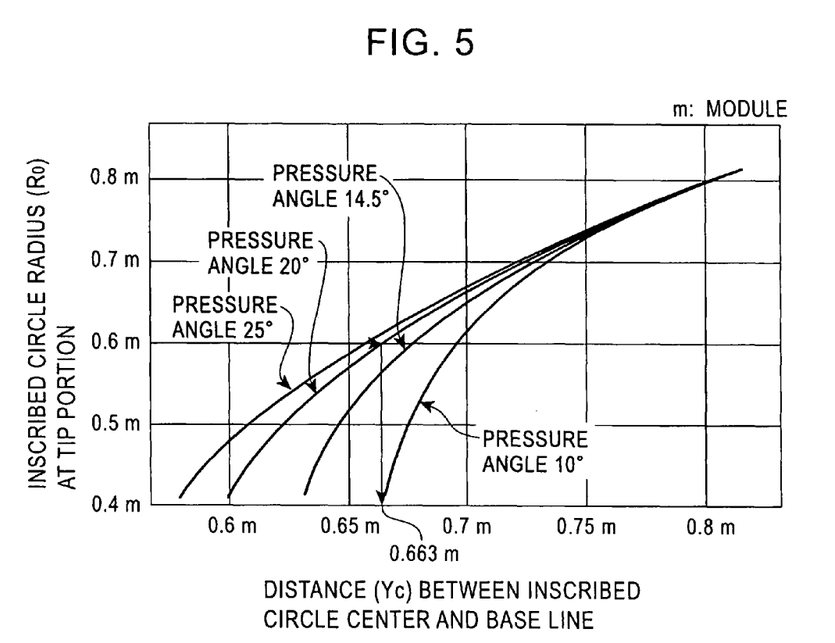
FIG. 5 is a graph of Cornu's spiral tooth profile characteristic curves which provide a Yc value and an $R_0$ value at various pressure angles of a Cornu's spiral tooth profile according to the present invention.

Tooth profile characteristic curves shown in FIG. 5 were obtained as a result of the evaluation concerning the tooth-profile figure. FIG. 5 is a graph illustrating the relationship at a particular pressure angle between the Yc value and the radius $R_0$ value of an arc inscribed in a tooth profile curve at the tip portion/root of the tooth. Both values are expressed in modules m. A method of determining tooth profile data of module using this figure will be described. For example, when the module m is 3 and the pressure angle α is 20 degrees, if $R_0$ is 1.8 mm, an intersection point of a horizontal line, which is generated from an $R_0$=0.6 module point at the vertical axis, and a characteristic curve having a pressure angle of 20 degrees is determined. Next, a vertical line is extended downward from the intersection point. Reading the scale gives a value of 0.663 modules, that is, Yc=1.989 mm.

Figure 6:
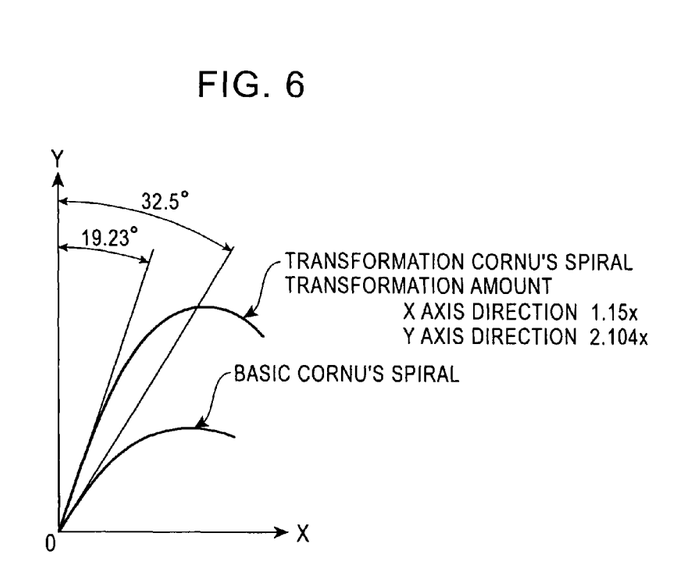
FIG. 6 shows a transformation Cornu's spiral according to an embodiment.

The present inventor et al. investigated ways to increase a degree of freedom in designing a Cornu's spiral tooth profile, and attempted to modify the Cornu's spiral. The result shows that a transformation Cornu's spiral, which is formed by multiplying each constant to the X coordinate value and the Y coordinate value of the Cornu's spiral, can also be used as a tooth profile curve. That is, it is possible to optimize the addendum value and a bottom clearance between the tip of a tooth and the bottom of a tooth as a result of selecting a transformation ratio on the basis of the conditions of a selected module, pressure angle, Ro and Yc. The transformation ratio can be freely selected in accordance with the size and intended use of gears and desired performance and characteristics of the gears. An embodiment of the transformation Cornu's spiral is shown in FIG. 6.

When the X coordinate value of the tip of a tooth of a basic Cornu's spiral or other Cornu's spirals (including a transformation Cornu's spiral), obtained by arbitrarily selecting a module and a pressure angle, does not become πm/4, it is possible to set as a center an arbitrary point on a vertical line that is parallel to a Y axis and where the X coordinate value is equal to πm/4, and to connect a circle that is inscribed in the curve with the curve at a contact point thereof, so that a tooth profile curve is formed. This tooth profile curve corresponds to one formed by a Cornu's spiral and another curve.

A first distinctive characteristic of the Cornu's spiral tooth profile according to the present invention obtained in this way is that, when the working surfaces engage each other, a recess and a protrusion are in flank contact with each other. This results from the fact that the Cornu's spiral is a continuous curve whose curvature change rate is constant. That is, at the contact point, the curvature radius of the protrusion and the curvature radius of the recess are substantially the same. Therefore, surface contact occurs, so that contact surface stress at the contact point is reduced, thereby providing a low-noise gear which is rarely worn. In contrast, in an involute tooth gear, protrusions contact at a point, as a result of which contact surface stress of the contact point is high.

Figure 7:
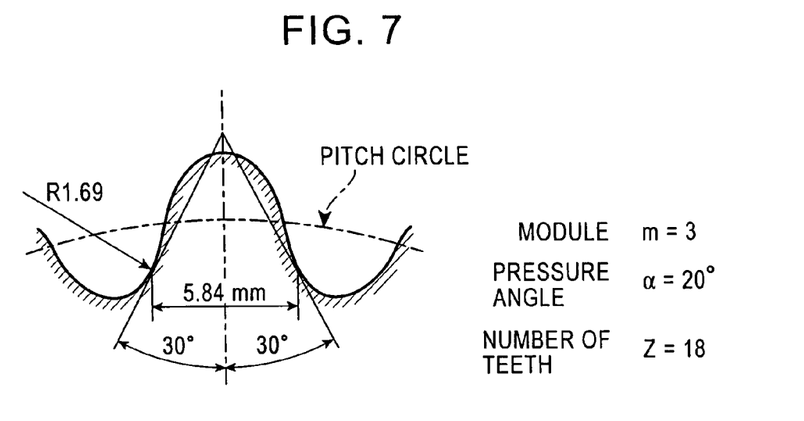
FIG. 7 shows a dedendum profile in a basic Cornu's spiral tooth gear according to an embodiment.
Figure 8:
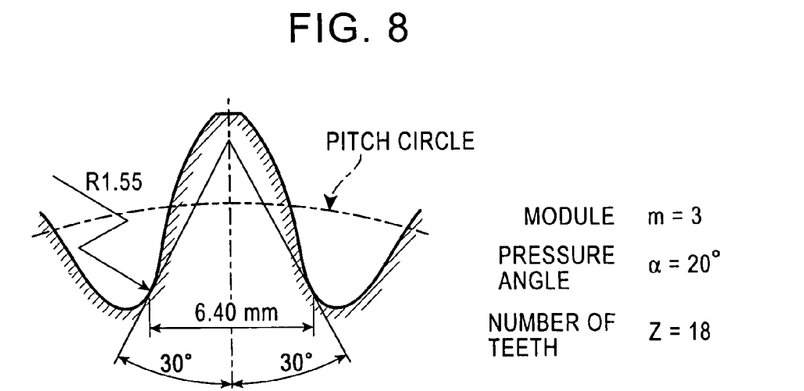
FIG. 8 shows a dedendum profile in a Cornu's spiral tooth gear according to another embodiment.
Figure 9:
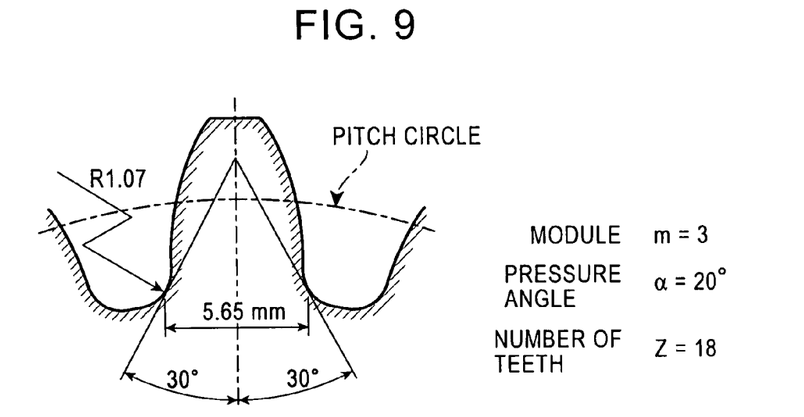
FIG. 9 shows a dedendum profile in a related involute tooth gear. For comparison purposes, the sizes of the tooth profiles in FIGS. 7 to 9 are made the same.

A second distinctive characteristic is that, as is clear from FIG. 1, the Cornu's spiral is a transition curve which very smoothly connects a straight line and an arc. Therefore, near the 0 point in FIG. 4, the tooth profile very closely resembles the profile of a straight line. In addition, near the point P, the tooth profile very closely resembles an arc. This means that the profile of the tooth profile curve closely resembles a straight line near a pitch point, and that the profiles of the tip and bottom of teeth closely resemble an arc. In other words, even if a slight difference occurs in a center distance of gears, actually occurring due to, for example, processing or assembly error in a gear working, a smooth working that corresponds to that of an involute tooth gear is achieved. In addition, even if, compared to an involute tooth gear, a gear has a smaller number of teeth and has a dedendum having a larger R dimension, the bottom of the tooth has a profile not having an undercut occurring due to generative processing. Therefore, there is small concentration caused by transmission load, so that a gear having a high dedendum bending strength is provided. FIGS. 7, 8, and 9 illustrate comparisons between a dedendum profile of an involute tooth gear and those of Cornu's spiral tooth gears, all having the same size. In these three embodiments, the dedendum strengths were compared by a finite element method on the basis of the same analysis condition. The result shows that the dedendum strength of the Cornu's spiral tooth gear shown in FIG. 8 is 120% the dedendum strength of the involute tooth gear shown in FIG. 9.

Figure 10:
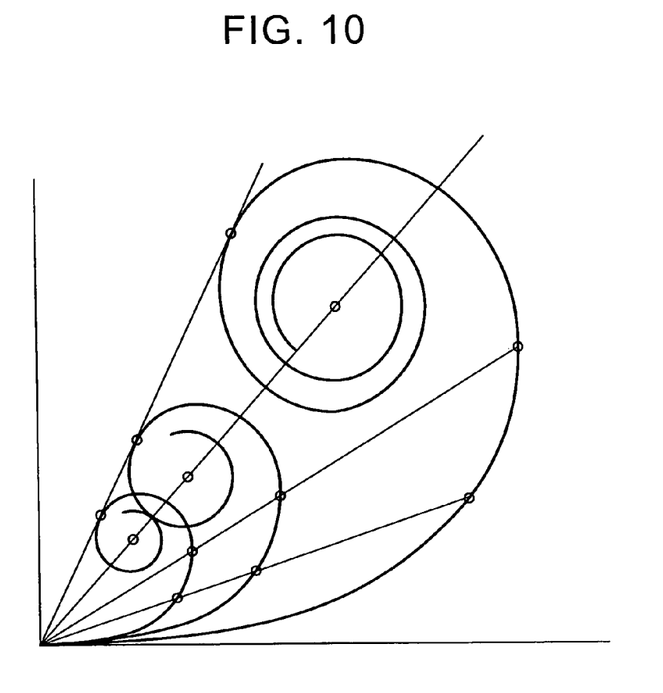
FIG. 10 shows similarities of Cornu's spirals.
Figure 11:
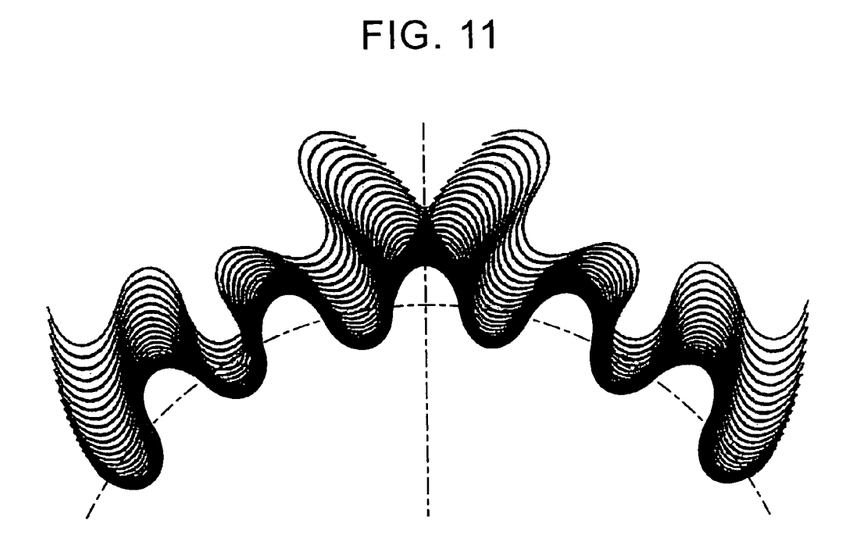
FIG. 11 is an envelope diagram showing a state in which a generative processing is performed using a hob cutter having a basic Cornu's spiral tooth profile according to an embodiment of the present invention.

A third distinctive characteristic is that, unlike a parabolic line or an ellipse, Cornu's spirals are all similar. Even if Cornu's spirals are drawn under different conditions, only the sizes of the figures are different, so that they have exactly the same profile. This state is shown in FIG. 10. By virtue of this distinctive characteristic, even in a Cornu's spiral tooth gear, it is possible to specify and standardize the dimensions of the tooth profile using modules on the basis of the same concept as that of an involute tooth gear. Therefore, even in a gear cutting method that is currently widely used, a hob cutter can be controlled by modules. This is a very important and significant distinctive character from the point of view of widespread use of a Cornu's spiral tooth gear. FIG. 11 is an envelope diagram showing a state in which a generative processing is performed using a hob cutter having the basic Cornu's spiral tooth profile.

When a tooth profile is used as a power transmission gear, a bottom clearance is often required. This commonly applies to a basic Cornu's spiral tooth profile and a tooth profile formed by a Cornu's spiral, an arc, and a straight line. To provide the bottom clearance, the radius $R_0$ of an arc that is inscribed at either the tip of a tooth or the bottom of a tooth is made slightly larger or smaller for smooth connection to the Cornu's spiral. Alternatively, the apex of the tip of the tooth not involved in the working may be cut on the basis of a horizontal line to provide any bottom clearance.

In an involute tooth gear, for making the contact ratio of the gears large, helical gears are selected instead of spur gears. Similarly, for the Cornu's spiral tooth gear according to the present invention, a spur gear or helical gear can be manufactured without any problems. When a helical gear is used, a low-noise gear having a higher bending strength is obtained.

Example 1

Figure 12:
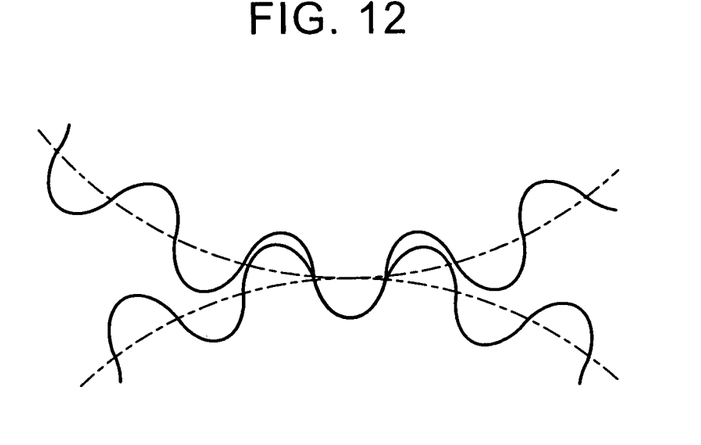
FIG. 12 shows a state of working of a pair of gears having a basic Cornu's spiral tooth profile according to an embodiment of the present invention.
Figure 13:
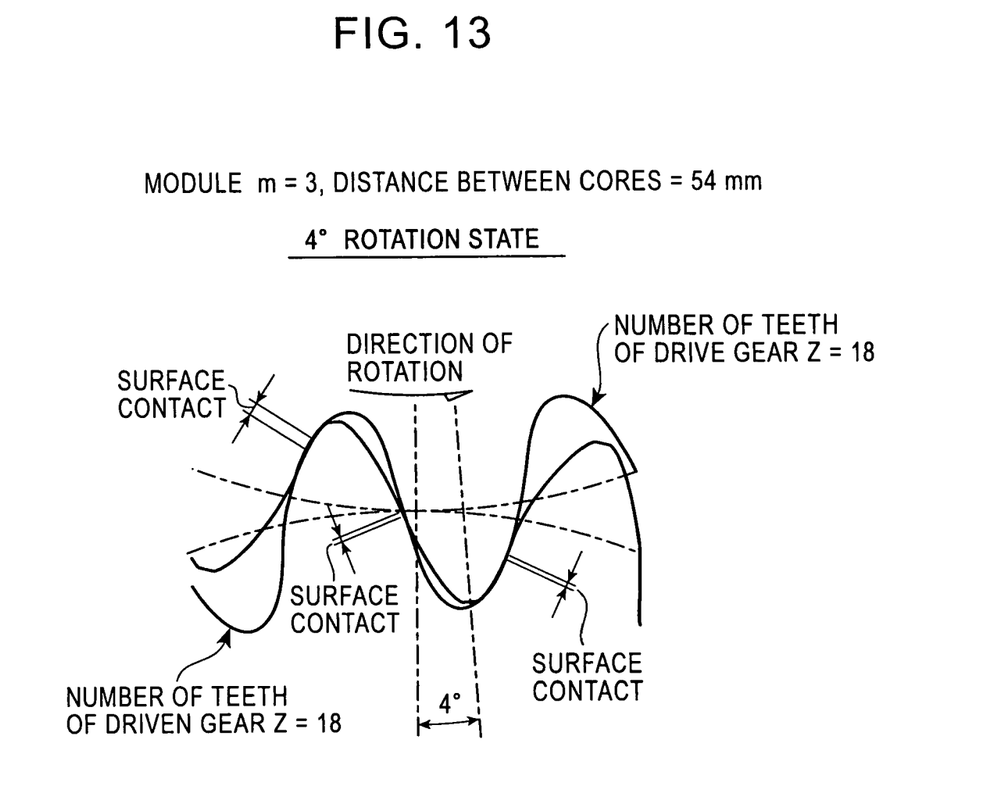
FIG. 13 shows a state of working of a pair of gears having a Cornu's spiral tooth profile according to an embodiment of the present invention. Table 1 shows the results of a noise test of an involute tooth gear and the various Cornu's spiral tooth gears according to the embodiments of the present invention.

The inventor et al. manufactured two spur gears where module m=3, the pressure angle α=20 degrees, and the number of teeth Z=18. Data indicating that $R_0$=1.80 mm and Yc=1.989 mm was obtained from FIG. 5, to determine a basic Cornu's spiral tooth profile, and a wire cut electric spark machine based on a numerical control method was used to cut out and manufacture the gears from high-carbon steel. Here, the inventor et al. completed a computer program for forming a profile of a generative gear using figure data of the basic tooth profile. One of the gears manufactured in this way was fitted to a driving shaft, and the other gear was fitted to a driven shaft, so that both of the gears were engaged and rotated. FIG. 12 is an enlarged partial view of a working state. A pair of involute tooth gears having the same module were manufactured using the same material and processing method, and were similarly tested. The result confirms that the Cornu's spiral tooth gears according to the present invention perform smooth rotation transmission comparable to those of the involute tooth gears. In addition, as shown clearly by a working state not having a space in FIG. 12, it is found that the basic Cornu's tooth gear is suitable for use in a gear pump.

Example 2

One primary cause of noise that is generated when gears are engaged and driven is based on a combination of tooth profiles of the gears at a starting point of working of a dedendum of the drive gear and the tip portion of a tooth of the driven gear. Considering this point, the inventor et al. manufactured an involute tooth gear and Cornu's spiral tooth gears having various tooth profiles (such as various pressure angles, addendum lengths, dedendum lengths, and profiles of the tip portions of teeth) as a result of using the same module and the same number of teeth and the same material and processing method as those of the basic Cornu's spiral tooth gears according to Example 1. Working running tests of the gears having different tooth profiles were carried out under the same test conditions. The result confirms that, as shown in Table 1, there are Cornu's spiral tooth gears generating less noise than the involute tooth gear.

In the examples, the Cornu's spiral tooth profiles were all manufactured using Kanai's Formulas (1) and (2). However, it is possible to form figures of the Cornu's spirals by other solution methods. For example, it is possible to similarly obtain coordinate data of the Cornu's spirals on the basis of Formulas (13), (14), (15), (16), and (17) provided by Murakami.

$$X_{i+1} = X_i + d_i\cos\theta_i\cos\tau_i - d_i\sin\theta_i\sin\tau_i \tag{13}$$

$$Y_{i+1} = Y_i + d_i\sin\theta_i\cos\tau_i - d_i\cos\theta_i\sin\tau_i \tag{14}$$

$$\tau_i = \frac{\rho L^2}{2}i^2 \tag{15}$$

$$d_i\cos\theta_i = \left( \begin{array}{c} L - \frac{\kappa_i^2}{3!}L^3 - \frac{3\kappa_i\rho}{4!}L^4 + \\ \frac{\kappa_i^4 - 3\rho^2}{5!}L^5 + \frac{10\kappa_i^3\rho}{6!}L^6 + \ldots \end{array} \right) \tag{16}$$

$$d_i\sin\theta_i = \left( \begin{array}{c} \frac{\kappa_i}{2!}L^2 + \frac{\rho}{3!}L^3 - \frac{\kappa_i^3}{4!}L^4 - \\ \frac{6\kappa_i^2}{5!}L^5 + \frac{\kappa_i^5 - 15\kappa_i\rho^2}{6!}L^6 + \ldots \end{array} \right) \tag{17}$$

where i=0, 1, 2, 3, . . . , N for Formulas (13) to (17).

INDUSTRIAL APPLICABILITY

The Cornu's spiral tooth gear according to the present invention has many advantages that are not provided by an involute tooth gear while providing almost all of the practical advantages of the involute tooth gear which is currently mainstream. Therefore, it is open to various applications. Some applications in which the advantages of the tooth profile are noticeable are as follows. According to a first advantage, an allowable load is increased due to a reduction in surface stress at working contact surfaces and a reduction in a dedendum stress resulting from the absence of an undercut. This makes it possible to reduce the thickness, that is, the weight of the gear, so that the tooth profile is very attractive for use in, for example, devices whose weight needs to be reduced, such as a flying object, a high-speed moving body, a remotely controlled robot, and a human-body mounting device.

According to a second advantage, not only can module control be carried out, but also, even for a specified module, a pressure angle, a profile of a Cornu's spiral, and a tooth depth can be freely set to manufacture a gear having a tooth profile most suitable for the purpose of use. In other words, even in a current mechanical device, when a person is dissatisfied with an involute tooth gear, it is possible to use a Cornu's spiral tooth gear having the same module and the same number of teeth instead without changing the center distance, so that a person is no longer dissatisfied.

According to a third advantage, a smooth working rotation is performed even if backlash is completely eliminated. Since related tooth gear systems run without backlash, they have been variously designed. This requires a mechanism or device. In the gear according to the present invention, if the tooth profile and the tooth depth are made suitable, it is possible to perform smooth rotation while completely eliminating backlash. This distinctive characteristic is useful in high-technology machines that require precise alignment, such as printing machines, medical equipment, and manipulators.

TABLE 1

| GEAR NOISE TEST | | | | |
|---|---|---|---|---|
| GEAR | PRESSURE ANGLE (DEGREES) | ADDENDUM VALUE (m×) H1 | DENDENDUM VALUE (m×) H2 | NOISE (dB) |
| INVOLUTE TOOTH GEAR (FIG. 9) | 20 | 1.00 | 1.25 | 78~79 |
| CORNU'S SPIRAL TOOTH GEAR A | 20.5 | 1.18 | 1.20 | 76~78 |
| CORNU'S SPIRAL TOOTH GEAR B | 22 | 1.12 | 1.15 | 76 |
| CORNU'S SPIRAL TOOTH GEAR C (FIG. 8) | 20 | 1.13 | 1.20 | 76~77 |

TEST CONDITIONS ETC.
MODULE m = 3, NUMBER OF TEETH Z = 18, RACK SHIFT COEFFICIENT 0
NOISE MEASUREMENT DEVICE-SIDE 1,000 mm, ROTATIONAL SPEED 1800 rpm
GEAR PROCESSING METHOD WIRE CUT ELECTRIC SPARK PROCESSING
GEAR MATERIAL HIGH-CARBON STEEL, SHEET THICKNESS 10 mm
LUBRICATING METHOD OIL SPRAY IMMEDIATELY BEFORE RUNNING
RUNNING METHOD OPEN GEAR METHOD
LOAD 2 Nm

The invention claimed is:

1. A tooth gear, wherein a tooth comprises:
a tip portion, which is defined by a horizontal line;
a bottom portion, which is arc-shaped; and
a portion between the tip portion and the bottom portion, wherein the portion between the tip portion and the bottom portion has a shape of a Cornu's spiral.

2. A tooth gear, wherein a tooth comprises:
a tip portion, which is defined by a horizontal line;
a bottom portion, which is arc-shaped; and
a portion between the tip portion and the bottom portion, wherein the portion between the tip portion and the bottom portion has a shape of a transformation Cornu's spiral, which is obtained by at least one of expanding and contracting a Cornu's spiral in at least one of an X-axis direction and a Y-axis direction.

3. A tooth gear, wherein a tooth comprises:
a tip portion;
a bottom portion; and
a portion between the tip portion and the bottom portion;
wherein the tip portion, the bottom portion, and the portion between the tip portion and the bottom portion have a shape of a Cornu's spiral.

* * * * *